Oct. 27, 1964  J. MAJANOVIC  3,154,350
SAFETY VALVES FOR VEHICLE BRAKE SYSTEMS
Filed Jan. 31, 1963

Inventor
JOSIP MAJANOVIC by: *Cavanagh & Norman.*

United States Patent Office 3,154,350
Patented Oct. 27, 1964

3,154,350
SAFETY VALVES FOR VEHICLE BRAKE SYSTEMS
Josip Majanovic, 20 Somerset Ave., Toronto, Ontario, Canada
Filed Jan. 31, 1963, Ser. No. 255,363
Claims priority, application Canada Feb. 16, 1962
3 Claims. (Cl. 303—84)

This invention relates to a valve for use on a vehicle brake system of the hydraulic type to provide automatic isolation of portions of the system in the event of failure due to suddenly occurring leaks.

It is a conventional practice in the design of hydraulic brake systems to provide one power or master cylinder interconnected with actuating or wheel cylinders by a common network of hydraulic lines. During normal operation of the braking system, this practice is of necessity since all wheel cylinders must operate at one pressure, whereby equal braking effects are achieved. However, upon a sudden leak occurring in the system, such as a ruptured line or the like, pressure therewithin is immediately lost throughout with, of course, loss of braking effect on all wheels.

While is is also common practice to provide an emergency mechanical braking system, usually operative on the two rear wheels, the force necessary to operate this brake to bring the vehicle to a safe stop is considerable and, indeed, beyond the strength of many operators. Further to this, in many circumstances, failure of the hydraulic system occurs at a time when the operator is occupied with other traffic, and the reaction time required to operate the emergency brake is, as is the force required, relative to the ability of the operator.

Accordingly, it is an object of the present invention to provide an isolating valve for use on hydraulic braking systems that will be automatically operable upon sudden pressure loss within the system.

It is a further object of this invention to provide a valve of the character described that may be easily installed in existing braking systems.

It is a still further object of this invention to provide a valve as above that, while installed, will not interfere with the normal operation of the braking system.

It is a further object of this invention to provide a valve incorporating all of the foregoing objects while still providing a simple means for bleeding or removing entrapped air therein.

These and other objects and features of this invention will become apparent from the following discussion and accompanying drawings.

Figure 1:
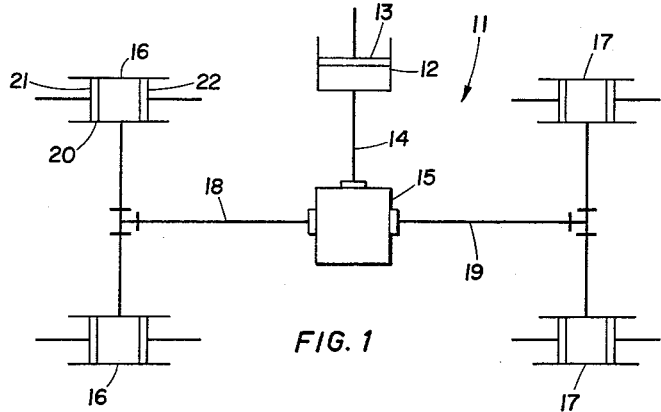
FIGURE 1 is a schematic diagram of a conventional hydraulic braking system such as is used on an automobile and illustrates the present invention incorporated therein.

With reference to FIGURE 1, an automobile braking system designated generally as 11 comprises a master cylinder 12 having contained therein piston 13 which is connected with the automobile service brake (not shown). A fluid transfer line 14 provides fluid communication between cylinder 12 and an isolating valve 15, which will be subsequently described.

Isolating valve 15 is in fluid communication with front wheel cylinders 16 and rear wheel cylinders 17 by means of hydraulic lines 18 and 19 respectively. A wheel cylinder as depicted, normally comprises cylinder 20 having contained therein in slidable engagement opposed pistons 21 and 22.

Upon depression of piston 13 within master cylinder 12, hydraulic fluid is displaced through lines 14, 18 and 19 to actuate in unison front wheel cylinders 16 and rear wheel cylinders 17 thus effecting actuation of the brake shoes. In normal practice, a standard T fitting is used in place of valve 15 in order to connect line 14 with lines 18 and 19. Obviously, with a conventional system, malfunction of hydraulic seals within any portion of the system or alternatively, rupture of any of the connecting lines or fittings, may result in immediate complete pressure loss within the system.

Figure 2:
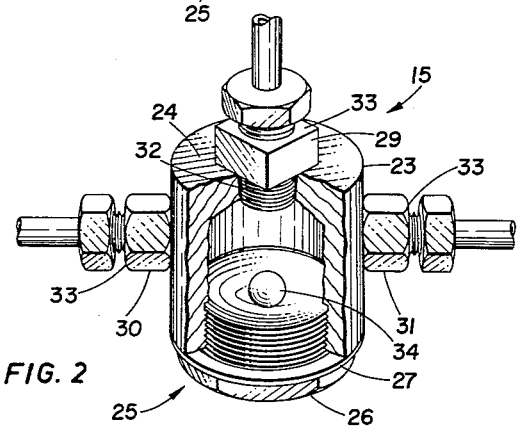
FIGURE 2 is a cut-away perspective view of a preferred embodiment of the isolating valve according to the present invention, and, FIGURE 3 is a mid-vertical section through the isolating valve incorporating the fluid attachment means therefor.

With reference to FIGURE 2, the isolating valve is illustrated in perspective and comprises housing 23 being of generally cylindrical configuration and having a closed end 24 and an open end indicated at 25. A plug 26 is threadably secured within open end 25 of housing 23 and is provided with sealing means such as washer 27 in order to seal the hollow chamber 28 within housing 23. A master cylinder adaptor 29 is threadably secured within end 24 and located preferably centrally thereof, while a pair of wheel cylinder adaptors 30, 31 are threadably secured within housing 23 in the sides thereof and are preferably in axial alignment with each other substantially towards the end of chamber 28 adjacent adaptor 29. In one preferred embodiment, see FIGURE 2, ends 32 of adaptors 29, 30 and 31 are provided with a tapered thread in order to obtain a good seal with the valve, whereas ends 33 are provided with a conventional thread adapted to receive standard hydraulic fittings such as the flared end type. A spheroid of resilient material such as rubber ball 34 is placed within chamber 28 and is normally free to move unrestrained therein.

Figure 3:
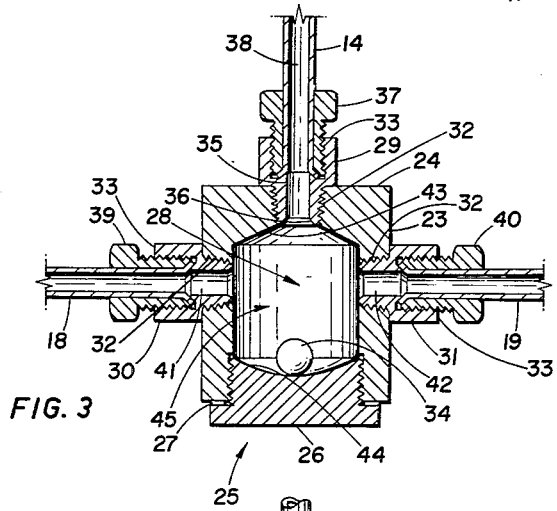

Referring to FIGURE 3, the isolating valve is shown in section whereby further detail of a pertinent nature is illustrated. As will be seen, adaptor 29 is provided with an internal bore 35 which terminates at the inner end in a flared conical surface 36. Hydraulic line 14 from the master cylinder 12 is secured to adaptor 29 by means of flare nut 37 in a conventional manner. As will be noted also, the internal diameter 38 of line 14 is substantially less than the diameter of bore 35. Adaptors 30 and 31 are similarly constructed and are provided with flare nuts 39 and 40 securing lines 18 and 19 respectively thereto.

As before, bores 41 and 42, formed in adaptors 30 and 31, have a diameter substantially greater than the internal diameter of lines 18 and 19. The internal surface 43 of end 24 is for this embodiment preferably formed conically to allow for bleeding of air. The internally disposed end 44 of plug 26 has a concave configuration covering substantially the full extent thereof. Also it will be seen from the drawing that the diameter of ball 34 is substantially greater than the diameter of bores 41 and 42, and in addition the diameter of bore 35 is substantially less than the diameters of bores 41 and 42. In normal operation, chamber 28 and bores 35, 41 and 42 together with the remaining hydraulic system as illustrated in FIGURE 1 are completely filled with hydraulic fluid 45.

In order to utilize the invention, the valve is installed within a conventional hydraulic system as illustrated in FIGURE 1 and the method of operation will be as follows.

In normal operation, depression of piston 13 by the brake pedal will cause fluid to flow throughout the hydraulic lines and effect operation of the wheel cylinders. It will be appreciated that under such conditions the pressure within chamber 28 of the valve 15 will be substantially high and indeed in most automobile systems may be in excess of 1,000 p.s.i. In addition the flow rate of hydraulic fluid through chamber 28 is, due to the comparatively large volume in comparison with the rate of flow within the hydraulic lines, relatively small. Furthermore, the substantially high pressure will cause compaction or compression of rubber ball 34 thereby increasing its density.

For these reason, under normal conditions, ball 34 will move little, if any, relative to its rest position within concave surface 44 in plug 26. The flow of hydraulic fluid 45 from line 14 through chamber 28 and thence to lines 18 and 19 will normally occur through the upper portion of chamber 28 only, thereby having little effect upon rubber ball 34 located in the bottom of chamber 28 at a substantial distance from adaptor bores 41 and 42.

However, upon sudden pressure loss within either portion of the hydraulic system supplied by lines 18 or 19, a sudden, massive flow of hydraulic fluid will occur which will increase the flow rate through chamber 28 thus causing a dragging action on rubber ball 34 in the direction in which the rupture occurs. Further to this, the sudden pressure decrease will cause ball 34 to expand and being less dense will, therefore, be readily picked up by the fluid stream.

Flow in the direction of the rupture or leak will occur until ball 34 is in position adjacent the inner tapered end of, say, bore 42 whereupon pressure within chamber 28 will increase and ball 34 will be forced within bore 42. The substantially smaller diameter of line 19 will prevent the entrance of ball 34 therein and the ball compressed within bore 42 will prevent further escape of hydraulic fluid.

Upon release of the pressure within the system, as will normally occur when the brake pedal is released, back pressure within the system, being of a comparatively negligible value, will not be sufficient to dislodge ball 34 and thus the braking system on either the front or rear wheels, as the case may be, may be used until repair to the damaged portion can be effected.

Upon it being necessary to repair the system, it will be a relatively simple matter to extract one of the adaptors either 30 or 31 and remove the rubber ball. Replacement of the ball within chamber 28 can be done through plug 26.

While one preferred embodiment of this invention has been described, it is contemplated that various alterations in the design to accommodate the requirements of manufacture and installation may be resorted to while still falling within the scope of the following claims.

What I claim is:

1. An isolating valve for use on vehicle hydraulic braking systems comprising: a housing having a cavity formed therein, said cavity having an upper end, a lower end, and confining sidewalls; a master cylinder adaptor having an inlet port therein in communication with said cavity at said upper end; at least two wheel cylinder adaptors having inlet ports therein in communication with said cavity at said sidewalls toward said upper end; a spheroid of compressible material within said cavity having an expanded diameter substantially greater than that of said inlet and outlet ports; fluid line communication means on all said adaptors, said line having a diameter less than that of any said ports; and hydraulic fluid within said cavity, ports, and lines, whereby upon a sudden drop in pressure in said lines communicating with either said wheel cylinder adaptors, said spheroid will expand thereby to decrease in density, the sudden flow of hydraulic fluid through said cavity picking up said spheroid thereby to force said spheroid into said one wheel cylinder adaptor plugging same and preventing further loss of fluid therefrom, said spheroid remaining in said wheel cylinder adaptor upon release of pressure within said system.

2. An isolating valve for use on vehicle hydraulic braking systems comprising: a housing having a cylindrical cavity formed therein, said cavity having an upper end, a lower end, and confining sidewalls; a master cylinder adaptor having an inlet port therein in communication with said cavity and concentric therewith at said upper end; at least two wheel cylinder adaptors having inlet ports therein in axial alignment with each other in communication with said cavity at said sidewalls toward said upper end; a spheroid of compressible material within said cavity having an expanded diameter substantially greater than that of said inlet and outlet ports; fluid line connection means on all said adaptors, said line having a diameter less than that of any said ports; and hydraulic fluid within said cavity, ports and lines, whereby upon a sudden drop in pressure in said lines communicating with either said wheel cylinder adaptors, said spheroid will expand thereby to decrease in density, the sudden flow of hydraulic fluid through said cavity picking up said spheroid thereby to force said spheroid into said one wheel cylinder adaptor plugging same and preventing further loss of fluid therefrom, said spheroid remaining in said wheel cylinder adaptor upon release of pressure within said system.

3. An isolating valve for use on vehicle hydraulic braking systems comprising: a housing having one closed end and one open end defining a cavity formed therein, said cavity having an upper end, a lower end, and confining sidewalls, a sealing plug in said open end; a master cylinder adaptor having an inlet port therein in communication with said cavity at said upper end; at least two wheel cylinder adaptors having inlet ports therein in communication with said cavity at said sidewalls toward said upper end; a concave surface formed on the inner face of said plug; a spheroid of compressible material within said cavity adapted to normally rest on said concave surface and having an expanded diameter substantially greater than that of said inlet and outlet ports; fluid line connection means on all said adaptors, said line having a diameter less than that of any said ports; and hydraulic fluid within said cavity, ports and lines, whereby upon a sudden drop in pressure in said lines communicating with either said wheel cylinder adaptors, said spheroid will expand thereby to decrease in density, the sudden flow of hydraulic fluid through said cavity picking up said spheroid thereby to force said spheroid into said one wheel cylinder adaptor plugging same and preventing further loss of fluid therefrom, said spheroid remaining in said wheel cylinder adaptor upon release of pressure within said system.

References Cited in the file of this patent

UNITED STATES PATENTS

| | | |
|---|---|---|
| 1,339,383 | Beese | May 11, 1920 |
| 2,054,900 | Friedmann et al. | Sept. 22, 1936 |
| 2,105,748 | McCarty | Jan. 18, 1938 |
| 2,381,484 | Blank | Aug. 7, 1945 |